(12) United States Patent
Mori et al.

(10) Patent No.: US 7,432,509 B2
(45) Date of Patent: Oct. 7, 2008

(54) RADIOGRAPHIC IMAGING SYSTEM

(75) Inventors: Harumichi Mori, Hamamatsu (JP);
Kazuki Fujita, Hamamatsu (JP); Ryuji Kyushima, Hamamatsu (JP); Masahiko Honda, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 117 days.

(21) Appl. No.: 10/536,280

(22) PCT Filed: Nov. 26, 2003

(86) PCT No.: PCT/JP03/15107

§ 371 (c)(1),
(2), (4) Date: Feb. 17, 2006

(87) PCT Pub. No.: WO2004/049002

PCT Pub. Date: Jun. 10, 2004

(65) Prior Publication Data

US 2006/0169908 A1      Aug. 3, 2006

(30) Foreign Application Priority Data

Nov. 26, 2002  (JP) ............................. 2002-342555

(51) Int. Cl.
*G01T 1/20* (2006.01)
(52) U.S. Cl. ................................. 250/370.11
(58) Field of Classification Search ............. 250/370.11
See application file for complete search history.

(56) References Cited

U.S. PATENT DOCUMENTS

| 5,079,426 A | * | 1/1992 | Antonuk et al. | ........ 250/370.09 |
| 6,075,248 A | | 6/2000 | Jeromin et al. | |
| 2003/0020020 A1 | * | 1/2003 | Kobayashi et al. | ..... 250/370.11 |

FOREIGN PATENT DOCUMENTS

| JP | 05-188148 | 7/1993 |
| JP | 09-297181 | 11/1997 |
| JP | H11-307756 | 11/1999 |
| JP | 2000-028735 | 1/2000 |
| WO | 98/36290 | 8/1998 |
| WO | 98/56214 | 12/1998 |

* cited by examiner

*Primary Examiner*—David P. Porta
*Assistant Examiner*—Mindy Vu
(74) *Attorney, Agent, or Firm*—Drinker Biddle & Reath LLP

(57) ABSTRACT

A radiographic imaging apparatus 1 has a solid-state image sensor 11, a scintillator 21, and others. The solid-state image sensor 11 has a photosensitive section 13 and an amplification section 15, which are formed on one side of an Si substrate 12. The photosensitive section 13 includes a plurality of photodiodes 16 as photoelectric converters for photoelectric conversion, and these photodiodes 16 are arrayed in a two-dimensional pattern. The amplification section 15 amplifies outputs from the photodiodes 16 and outputs amplified signals. The scintillator 21 is arranged to cover a region where the photosensitive section 13 and the amplification section 15 are formed on the one side of Si substrate 12, and is formed directly on the region.

4 Claims, 3 Drawing Sheets

RADIOGRAPHIC IMAGING SYSTEM

TECHNICAL FIELD

The present invention relates to a radiographic imaging apparatus.

BACKGROUND ART

An example of the known radiographic imaging apparatus of this type is one having a fiber optical plate (Hereinafter referred to as FOP), a scintillator disposed on one surface of the FOP, a semiconductor image sensor disposed opposite to the scintillator on the other surface of the FOP, an amplification section (amplifying element) for amplifying outputs from the semiconductor image sensor, and a frame disposed so as to surround the semiconductor image sensor and the amplification section (e.g., reference is made to Patent Document 1).

Another example of the known radiographic imaging apparatus is one having a photodetector array in which photodetectors for photoelectric conversion are arrayed in a one-dimensional or two-dimensional pattern, and a scintillator formed directly on light-incident surfaces of the photodetectors (e.g., reference is made to Patent Document 2).

[Patent Document 1] Japanese Patent Application Laid-Open No. 2000-28735

[Patent Document 2] PCT International Publication WO98/36290

DISCLOSURE OF THE INVENTION

In the case of the imaging apparatus as disclosed in Patent Document 1 above, it was impossible to further increase the area of the FOP itself and it was thus difficult to increase the image detecting area to a larger area. For this reason, one of conceivable countermeasures is the technique of forming the scintillator directly on the light-incident surfaces of the photodetectors, without use of the FOP, as disclosed in Patent Document 2 above. Another conceivable means is a technique of forming the scintillator on a support and bringing the scintillator into close contact with the light-incident surfaces of the photodetectors, instead of forming the scintillator directly on the light-incident surfaces of the photodetectors.

However, the configuration without the FOP was found to cause a new problem of deterioration of characteristics of the amplification section. Study and research by Inventors resulted in confirming that with radiation (e.g., X-rays) entering the scintillator or the frame, scattered radiation was produced by Compton effect. Even with the scattered radiation produced in the scintillator or in the frame, as long as the FOP is present, lead in the FOP shields against the scattered radiation. Without the FOP, however, the scattered radiation is not blocked and thus enters the amplification section. Therefore, the deterioration of characteristics of the amplification section is believed to be caused by the incidence of the scattered radiation. Particularly, where the photosensitive section like the semiconductor image sensor or the photodetector array, and the amplification section are formed on the same semiconductor substrate, the photosensitive section and the amplification section are located close to each other, and the scattered radiation is more likely to enter the amplification section. In a case where the amplification section is formed on an Si substrate, since the scattered radiation has energy lower than X-rays incident to the imaging apparatus and is largely absorbed in Si, the amplification section will suffer greater damage.

An object of the present invention is to provide a radiographic imaging apparatus capable of suppressing incidence of radiation to an amplification section and thereby preventing the deterioration of characteristics of the amplification section.

A radiographic imaging apparatus according to the present invention comprises: a substrate on one side of which a photosensitive section for photoelectric conversion of incident light and an amplification section for amplification of an output from the photosensitive section are formed; and a scintillator for converting radiation to visible light, which is arranged to cover a region where the photosensitive section and the amplification section are formed on the one side of the substrate.

In the radiographic imaging apparatus according to the present invention, the scintillator also covers the region where the amplification section is formed, and thus the scattered radiation produced in the scintillator or the like is absorbed and weakened by the scintillator before arrival at the amplification section. As a result, it becomes feasible to suppress the incidence of the scattered radiation appearing in the scintillator or the like, into the amplification section and to prevent the deterioration of characteristics of the amplification section.

In addition, the present invention uses the scintillator which the apparatus originally has, to suppress the incidence of the scattered radiation into the amplification section. For this reason, there is no need for use of a new radiation shielding member or the like for the purpose of suppressing the incidence of the scattered radiation, and there is no concern about complexity of the configuration of the apparatus, its production process, and so on.

Preferably, a shift register section for supplying the output from the photosensitive section to the amplification section is further formed on the one side of the substrate, and the scintillator is arranged to further cover a region where the shift register section is formed on the one side of the substrate. In this case, the scintillator also covers the region where the shift register section is formed, whereby it becomes feasible to suppress incidence of the scattered radiation appearing in the scintillator or the like, into the shift register section. As a result it is also feasible to prevent deterioration of characteristics of the shift register section.

The scintillator is preferably formed directly on the one side of the substrate. The photosensitive section preferably includes a plurality of photoelectric converters arrayed in a two-dimensional pattern.

BEST MODE FOR CARRYING OUT THE INVENTION

A radiographic imaging apparatus according to an embodiment of the present invention will be described with reference to the drawings. Identical elements or elements with identical functionality will be denoted by the same reference symbols in the description, without redundant description.

Figure 1:
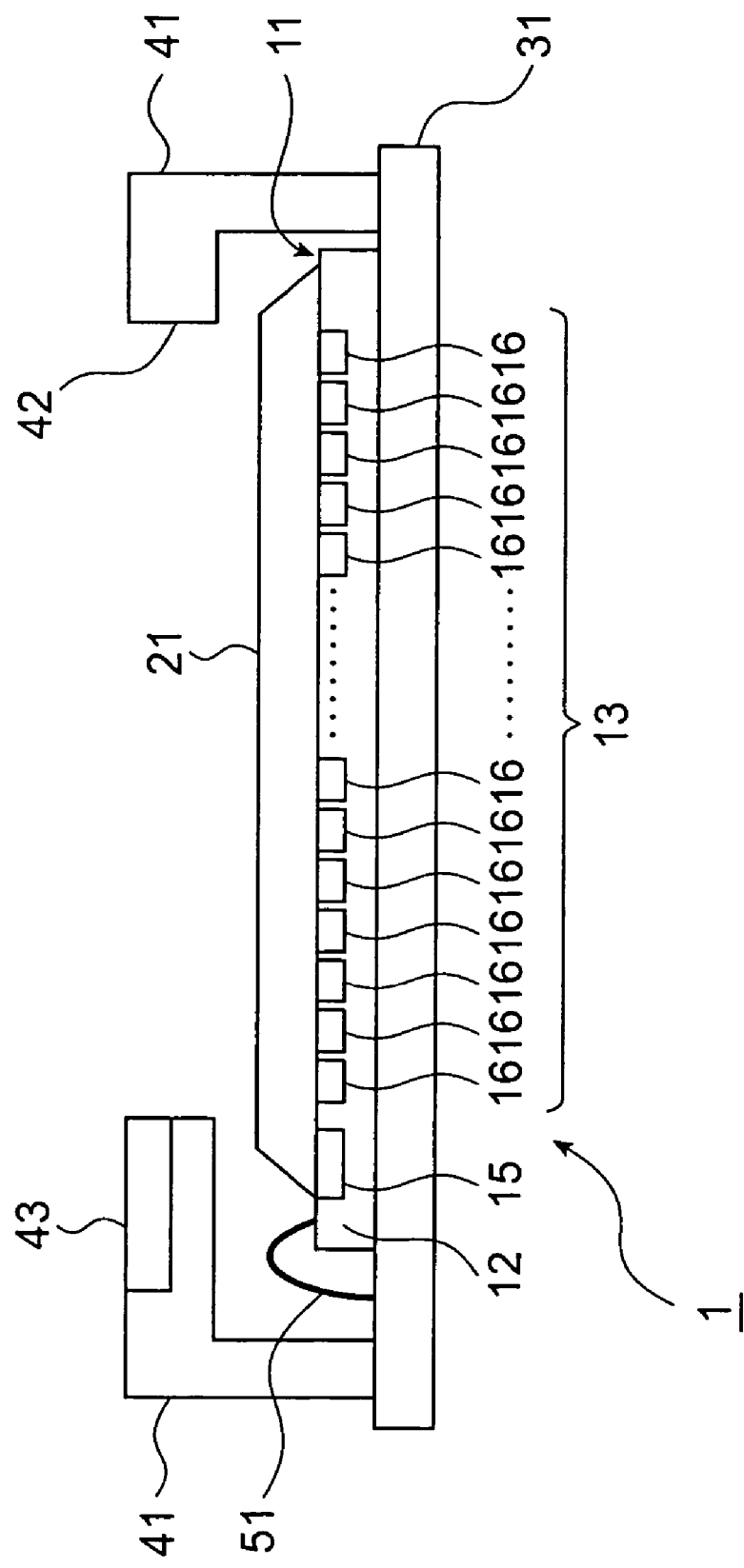
FIG. 1 is a schematic view for explaining a cross-sectional configuration of a radiographic imaging apparatus according to an embodiment of the present invention.
Figure 2:
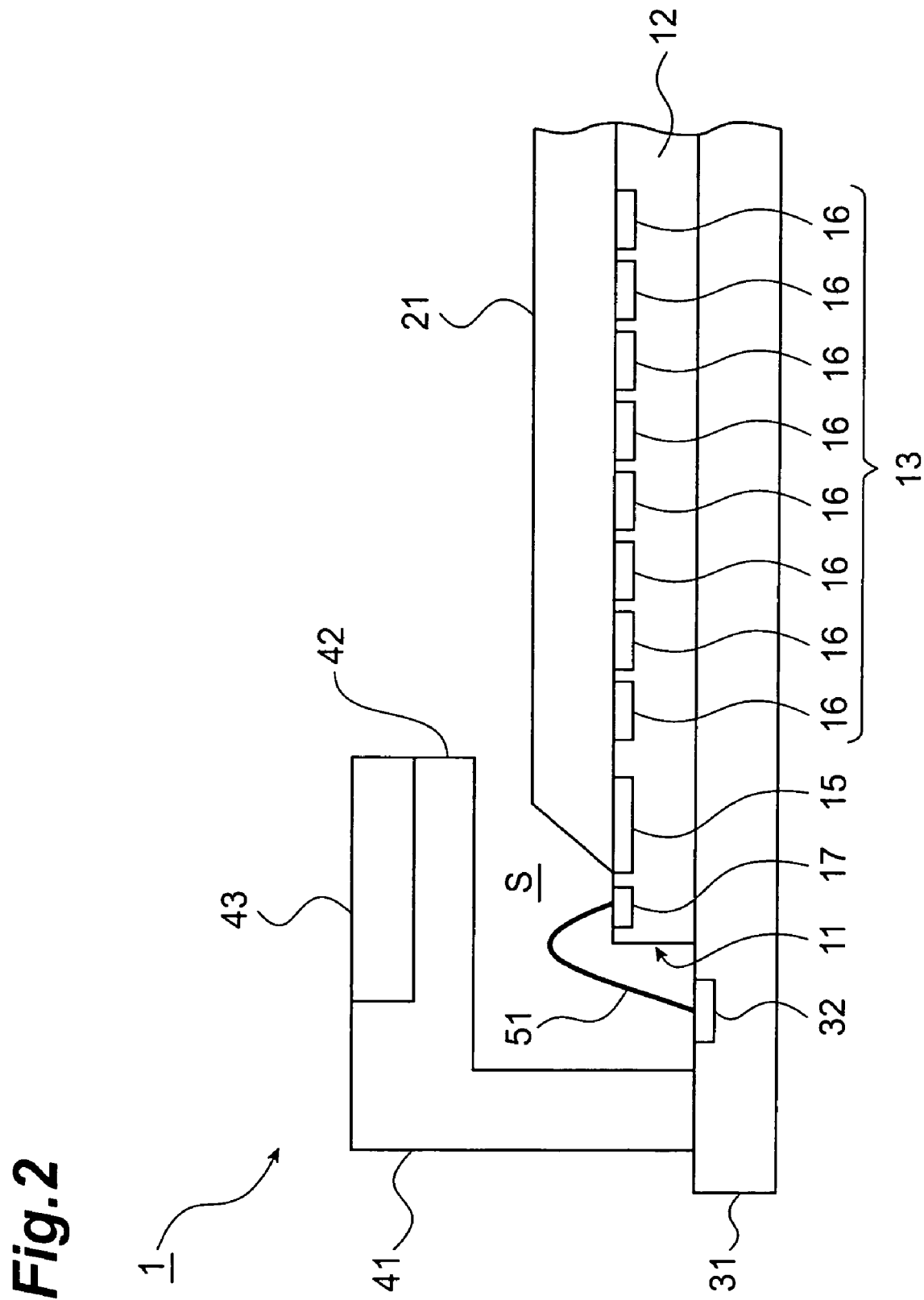
FIG. 2 is a schematic view for explaining the cross-sectional configuration of the radiographic imaging apparatus according to the embodiment of the present invention.
Figure 3:
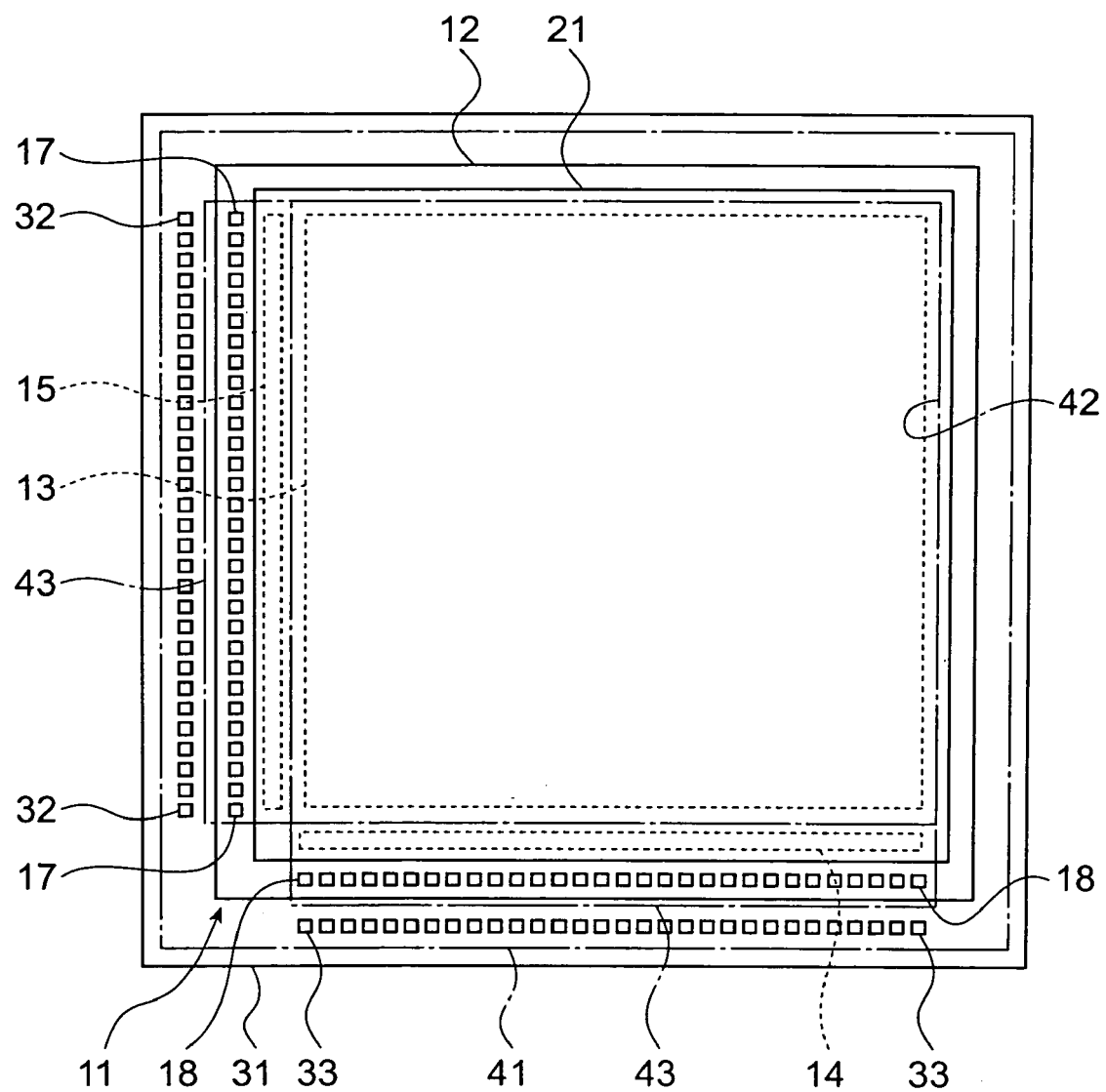
FIG. 3 is a plan view showing the radiographic imaging apparatus according to the embodiment of the present invention.

FIG. 1 and FIG. 2 are schematic views for explaining a cross-sectional configuration of the radiographic imaging apparatus according to the present embodiment, and FIG. 3 is a plan view showing the radiographic imaging apparatus according to the present embodiment. FIG. 3 is depicted without illustration of bonding wires.

The radiographic imaging apparatus 1 of the present embodiment, as shown in FIGS. 1 to 3, is composed of a solid-state image sensor 11, a scintillator 21, a mount substrate 31, a flame 41, and others.

The solid-state image sensor 11 is an MOS image sensor and has a photosensitive section 13, a shift register section 14, and an amplification section 15, which are formed on one side of an Si substrate 12. In this manner, the photosensitive section 13, the shift register section 14, and the amplification section 15 are formed on the same substrate (Si substrate 12). The Si substrate 12 (solid-state image sensor 11) is fixed on the mount substrate 31.

The photosensitive section 13 includes a plurality of photodiodes 16 as photoelectric converters for photoelectric conversion, and these photodiodes 16 are arrayed in a two-dimensional pattern. The solid-state image sensor 11 also has a plurality of MOSFETs (field effect transistors) (not shown) for controlling readout of charges generated in the respective photodiodes 16 in response to incidence of light. In the present embodiment, the area of the Si substrate 12 is approximately 16900 mm$^2$ (=130 mm×130 mm), and the area of the photosensitive section 13 approximately 15625 mm$^2$ (=125 mm×125 mm).

The shift register section 14 performs control of driving of the MOSFETs so as to sequentially read out the charges generated in the respective photodiodes 16 and output them to the corresponding amplification section 15. The shift register section 14 is electrically connected through wires (not shown) formed on the Si substrate 12, to the corresponding MOSFETs.

The amplification section 15 is electrically connectible through wires (not shown) formed on the Si substrate 12, to the corresponding photodiodes 16, amplifies outputs from the photodiodes 16, and outputs amplified signals. The amplification section 15 includes, for example, amplifiers (charge amplifiers) for amplifying the outputs (electric current outputs) from the photodiodes 16, capacitors connected in parallel to the amplifiers, switching elements connected in parallel to the amplifiers and capacitors, and so on.

A plurality of bonding pads 17 electrically connected to the amplification section 15 are formed on the Si substrate 12. These bonding pads 17 are electrically connected to corresponding bonding pads 32 formed on the mount substrate 31, by bonding wires 51. In this configuration, the outputs from the amplification section 15 are supplied via the mount substrate 31 to the outside of the imaging apparatus 1. A plurality of bonding pads 18 electrically connected to the shift register section 14 are also formed on the Si substrate 12 (particularly, of FIG. 3). These bonding pads 18 are electrically connected to corresponding bonding pads 33 formed on the mount substrate 31, by bonding wires (not shown). In this configuration, signals from the outside of the imaging apparatus 1 are supplied via the mount substrate 31 to the shift register section 14.

The scintillator 21 converts incident radiation (e.g., X-rays) to visible light and is of columnar structure. The scintillator 21, as also shown in FIG. 3, is arranged to cover the region where the photosensitive section 13, the shift register section 14, and the amplification section 15 are formed on one side of Si substrate 12, and is formed directly on the region. In this configuration, the scintillator 21 is arranged in contact with the region where the photosensitive section 13, the shift register section 14, and the amplification section 15 are formed on one side of the Si substrate 12. The region where the bonding pads 17, 18 are formed on one side of the Si substrate 12 is not covered by the scintillator 21, and is exposed.

A variety of materials can be used for the scintillator 21, and one of preferred materials is Tl (thallium) doped CsI, which demonstrates good luminous efficiency. A protective film (not shown) for hermetically sealing the scintillator 21 while covering the columnar structure of the scintillator 21 so as to fill its gaps is formed on the scintillator 21. The protective film is preferably a material that transmits radiation but shields against water vapor, e.g., poly-para-xylylene (trade name Parylene, available from Three Bond Co., Ltd.), and particularly preferably, poly-para-chloroxylylene (trade name Parylene C, available from the same company). In the present embodiment, the thickness of the scintillator 21 is approximately 300 µm.

The scintillator 21 can be formed by growing columnar crystals of CsI by deposition method. The protective film can be formed by CVD. The methods of forming the scintillator 21 and the protective film are disclosed in detail in the aforementioned Patent Document 2 (PCT International Publication WO98/36290) filed by Applicant of the present application, for example, and the description thereof is omitted herein.

The frame 41 is provided as fixed on the mount substrate 31 so as to surround the solid-state image sensor 11. The frame 41 has an opening 42 of rectangular shape formed at the position corresponding to the photosensitive section 13, and radiation is incident through the opening 42 to the scintillator 21. A space S is created between the frame 41, and the Si substrate 12 and the mount substrate 31. The shift register section 14 and the amplification section 15 of the solid-state image sensor 11, the bonding pads 17, 32, the bonding wires 51, etc. are located inside the space S. Since the bonding wires 51 are placed inside the space S defined by the frame 41, the Si substrate 12, and the mount substrate 31 as described above, the bonding wires 51 are protected from external physical stress, without being pushed by the frame 41. In addition, a shield 43 of a radiation-shielding material (e.g., lead or the like) is provided on the side opposite to the amplification section 15 side, on the frame 41, and the shield 43 well shields against radiation. In the present embodiment, the thickness of the shield 43 is approximately 2.5 mm.

In the radiographic imaging apparatus 1 of the present embodiment, as described above, the scintillator 21 also covers the region where the amplification section 15 is formed on the Si substrate 12, and thus the scattered radiation appearing in the scintillator 21 or in the frame 41 is absorbed and weakened by the scintillator 21 before arrival at the amplification section 15. This results in suppressing the incidence of the scattered radiation appearing in the scintillator 21 or in the frame 41, into the amplification section 15 and thereby preventing the deterioration of characteristics of the amplification section 15.

In the radiographic imaging apparatus 1 of the present embodiment, the scintillator 21 can also be formed on the region where the amplification section 15 is formed on the Si substrate 12, by the step of forming the scintillator 21 on the image sensing side of the solid-state image sensor 11. Since the scintillator 21 as an originally existing component is used to suppress the incidence of scattered radiation to the amplification section 15 in this manner, there is no need for provision of a new radiation shielding member or the like for the purpose of suppressing the incidence of scattered radiation, and there is no complexity of the configuration of the radiographic imaging apparatus 1, the production process thereof, and so on.

In the radiographic imaging apparatus 1 of the present embodiment, the scintillator 21 also covers the region where the shift register section 14 is formed on the Si substrate 12, and thus it also suppresses the incidence of scattered radiation appearing in the scintillator 21 or in the flame 41, into the shift register section 14 and also prevents deterioration of characteristics of the shift register section 14.

The present invention is by no means intended to be limited to the above-described embodiment. For example, a CCD image sensor may also be used instead of the MOS image sensor as the solid-state image sensor 11 in the present embodiment.

The scintillator 21 is formed directly on the Si substrate 12 in the present embodiment, but the configuration does not have to be limited to it. For example, it is also possible to adopt a configuration wherein a scintillator substrate is formed by laying a scintillator on a radiation-transmitting substrate and wherein the scintillator substrate is placed so as to keep the scintillator in contact with the region where the photosensitive section 13, the shift register section 14, and the amplification section 15 are formed on one side of the Si substrate 12. Where a protective film is formed on the scintillator, the protective film is brought into contact with the region where the photosensitive section 13, the shift register section 14, and the amplification section 15 are formed.

INDUSTRIAL APPLICABILITY

The radiographic imaging apparatus of the present invention is applicable to radiographic imaging systems of large area, particularly, used in medical and industrial X-ray photography.

The invention claimed is:

1. A radiographic imaging apparatus comprising:
    an Si substrate on one side of which a photosensitive section for photoelectric conversion of incident light and an amplification section for amplification of an output from the photosensitive section are formed; and
    a scintillator for converting radiation to visible light, which is arranged to cover a region where the photosensitive section and the amplification section are formed on the one side of the Si substrate,
    wherein a plurality of bonding pads electrically connected to the amplification section are further formed on the one side of the Si substrate, and
    wherein a region where the plurality of bonding pads are formed on the one side of the Si substrate is not covered by the scintillator.

2. The radiographic imaging apparatus according to claim 1, wherein a shift register section for supplying the output from the photosensitive section to the amplification section is further formed on the one side of the Si substrate, and
    wherein the scintillator is arranged to further cover a region where the shift register section is formed on the one side of the Si substrate.

3. The radiographic imaging apparatus according to claim 1, wherein the scintillator is formed directly on the one side of the Si substrate.

4. The radiographic imaging apparatus according to claim 1, wherein the photosensitive section includes a plurality of photoelectric converters arrayed in a two-dimensional pattern.

* * * * *